US011049276B2

(12) United States Patent
Chen et al.

(10) Patent No.: US 11,049,276 B2
(45) Date of Patent: Jun. 29, 2021

(54) POSITIONING GUIDANCE METHOD AND SYSTEM FOR TOOTH BRACKETS

(71) Applicants: Industrial Technology Research Institute, Hsinchu (TW); China Medical University, Taichung (TW)

(72) Inventors: Jian-Ren Chen, Hsinchu (TW); Guan-An Chen, Hsinchu (TW); Su-Chen Huang, Taoyuan (TW); Yin-Chun Liu, Taoyuan (TW); Yue-Min Jiang, New Taipei (TW); Chien-Hung Yu, Taichung (TW); Yu-Cheng Lo, Taichung (TW)

(73) Assignees: INDUSTRIAL TECHNOLOGY RESEARCH INSTITUTE, Hsinchu (TW); CHINA MEDICAL UNIVERSITY, Taichung (TW)

( * ) Notice: Subject to any disclaimer, the term of this patent is extended or adjusted under 35 U.S.C. 154(b) by 0 days.

(21) Appl. No.: 16/396,614

(22) Filed: Apr. 26, 2019

(65) Prior Publication Data
US 2020/0005483 A1    Jan. 2, 2020

Related U.S. Application Data

(60) Provisional application No. 62/691,823, filed on Jun. 29, 2018.

(30) Foreign Application Priority Data

Jan. 7, 2019  (TW) ................. 108100527

(51) Int. Cl.
*G06K 9/00*    (2006.01)
*G06T 7/73*    (2017.01)
(Continued)

(52) U.S. Cl.
CPC .............. *G06T 7/73* (2017.01); *G06T 7/0012* (2013.01); *G06T 19/006* (2013.01); *G06T 2207/30036* (2013.01)

(58) Field of Classification Search
CPC ........ G06T 7/73; G06T 7/0012; G06T 19/006
(Continued)

(56) References Cited

U.S. PATENT DOCUMENTS 6,123,544 A    9/2000  Cleary
7,013,191 B2   3/2006  Rubbert et al.
(Continued)

FOREIGN PATENT DOCUMENTS

CN    101249001    8/2008
CN    103479430    1/2014
(Continued)

OTHER PUBLICATIONS

Taiwan Patent Office, Office Action, Patent Application Serial No. 108100527, dated Apr. 14, 22020. Taiwan.
(Continued)

*Primary Examiner* — Stephen P Coleman

(57) ABSTRACT

A positioning guidance method for tooth brackets is provided. The positioning guidance method includes: obtaining, via an image capturing unit, an oral image; obtaining, via a processor, a position of a candidate tooth according to the contour of a plurality of teeth in the oral image; obtaining, via the processor, a bracket setting position corresponding to the candidate tooth by accessing dental model information from a storage device according to the position of the candidate tooth; obtaining, via the processor, a bracket image corresponding to a bracket from the oral image; and displaying, via the processor, guidance indication on a display unit according to a bracket position corresponding to the bracket image and the bracket setting position.

10 Claims, 5 Drawing Sheets

(51) Int. Cl.
*G06T 19/00* (2011.01)
*G06T 7/00* (2017.01)

(58) Field of Classification Search
USPC .......................................................... 382/103
See application file for complete search history.

(56) References Cited

U.S. PATENT DOCUMENTS

| | | | |
|---|---|---|---|
| 7,556,497 B2 | 7/2009 | Taub et al. | |
| 2008/0248437 A1* | 10/2008 | Marshall | A61C 7/146 433/3 |
| 2009/0322868 A1* | 12/2009 | Ikeda | A61B 5/0088 348/77 |
| 2010/0028823 A1* | 2/2010 | Reid | C07C 391/00 433/6 |
| 2018/0168781 A1* | 6/2018 | Kopelman | G16H 50/50 |

FOREIGN PATENT DOCUMENTS

| | | |
|---|---|---|
| CN | 104146786 | 11/2014 |
| CN | 104720902 | 6/2015 |
| CN | 105748163 | 7/2016 |
| TW | M414941 | 11/2011 |
| TW | I371264 | 9/2012 |
| TW | I549661 | 9/2016 |
| TW | M544918 | 4/2017 |
| TW | M544915 | 7/2017 |
| TW | I605798 | 11/2017 |
| TW | I613561 | 2/2018 |

OTHER PUBLICATIONS

Taiwan Patent Office, Office Action, Patent Application Serial No. 108100527, dated Nov. 27, 2020, aiwan.

* cited by examiner

POSITIONING GUIDANCE METHOD AND SYSTEM FOR TOOTH BRACKETS

CROSS REFERENCE TO RELATED APPLICATIONS

This application claims the benefit of U.S. Provisional Application No. 62/691,823, filed Jun. 29, 2018, and claims priority from, Taiwan (International) Application Serial Number 108100527, filed Jan. 7, 2019, the entirety of which is incorporated by reference herein.

TECHNICAL FIELD

The present disclosure relates to a positioning guidance method system for tooth brackets.

BACKGROUND

Since malocclusion of the teeth can directly affect chewing and is not aesthetically pleasing, modern medicine has developed an orthodontic technique to solve the problem of malocclusion. However, when a dentist attaches the brackets (the tooth brackets) and implants related implants, such as a temporary anchorage device, it is necessary to attach the brackets and implant the temporary anchorage device according to preoperative planning and practical experience. The practical experience of the dentist will affect the time of attachment and the number of re-attaching brackets and outpatient clinic schedule, and may affect the orthodontic effect. Therefore, how to accurately present the bracket position on the teeth and shorten the attaching time is a problem to be solved.

SUMMARY

The present disclosure provides a positioning guidance method for tooth brackets. The positioning guidance method includes obtaining, via an image capturing unit, an oral image; obtaining, via a processor, a position of a candidate tooth according to the contour of the teeth in the oral image; obtaining, via the processor, a bracket setting position corresponding to the candidate tooth by accessing a dental model information from a storage device according to the position of the candidate tooth; obtaining, via the processor, a bracket image corresponding to a bracket from the oral image; and displaying, via the processor, guidance indication in a display unit according to a bracket position corresponding to the bracket image and the bracket setting position.

The present disclosure provides a positioning guidance system for tooth brackets. The positioning guidance system includes an image capturing unit, a storage device, a processor, and a display unit. The image capturing unit is configured to obtain an oral image of a patient. The storage device stores a dental model information corresponding to the patient. The processor is configured for obtaining a position of a candidate tooth according to the contour of the teeth in the oral image; obtaining a bracket setting position corresponding to the candidate tooth by accessing the dental model information from the storage device according to the position of the candidate tooth; obtaining a bracket image corresponding to a bracket from the oral image; and obtaining guidance indication according to a bracket position corresponding to the bracket image and the bracket setting position. The display unit is configured to display the oral image and the guidance indication.

DETAILED DESCRIPTION

The following description is a preferred embodiment of the disclosure, and is intended to describe the basic principle of the disclosure, but is not intended to limit the disclosure. The actual disclosure content must be referenced to the scope of the following claims.

It should be understood that the words "comprise" and "include" used in the present specification are used to indicate that there are specific technical features, values, method and steps, processes, elements and/or components, but does not exclude additional technical features, values, method and steps, processes, elements, components, or the any combination of the above.

Figure 1:
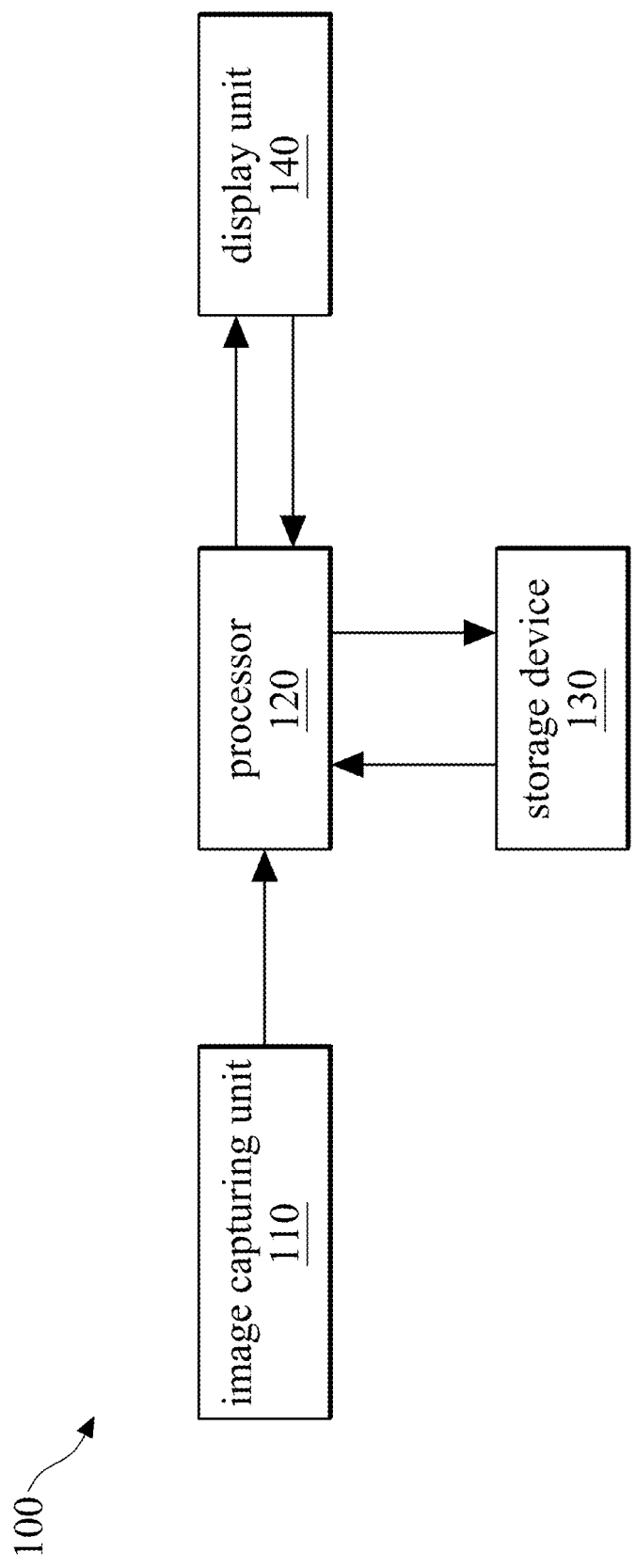
FIG. 1 illustrates a positioning guidance system for tooth brackets, in accordance with some embodiments of the present disclosure.

FIG. 1 illustrates a positioning guidance system for tooth brackets, in accordance with some embodiments of the present disclosure. The positioning guidance system 100 at least includes an image capturing unit 110, a processor 120, a storage device 130, and a display unit 140. The image capturing unit 110 is a camera, which can be disposed on a holder of an operating lamp of a dental chair or disposed on glasses worn by a dentist to obtain a facial image of a patient. The processor 120 can be implemented in various manners, such as dedicated hardware circuits or general-purpose hardware (e.g., a single processor, a multi-processor with parallel processing capability, a graphics processor, or other processor with computing capability). When the code or software related to the embodiment of the present disclosure is executed, the functions described later are provided. The storage device 130 is configured to store information required during execution, such as dental model information of the patient. The dental model information can be obtained by modeling the patient's teeth and scanning the plaster model by 3D scanning. In addition, the dental model information further includes bracket setting positions corresponding to each tooth, and each bracket setting positions is located on the facial axis of the clinical crown (FACC) of each tooth. The display unit 140 may include a display panel (such as a thin film liquid crystal display panel, an organic light emitting diode panel or other panel having display capability) or a Google Glass (i.e., a wearable computer equipped with an optical head-mounted display) for displaying oral images and guidance indications provided for the dentist. In other words, the positioning guidance method of the present disclosure can be displayed to the dentist as, for example, augmented reality, virtual reality, mixed reality, or any other display manner combining the bracket setting position and the real-time image, the disclosure is not limited thereto. Further, the positioning guidance system 100 further includes a communication interface (not shown in FIG. 1) between the processor 120 and the display unit 140. The communication interface can be a wireless telecommunications module, a local area network (LAN) communication module, or a wireless local area network communication module (WLAN). The wireless telecommunications module may include a modem that supports 2G, 3G, 4G, or any combination of the above technology generations.

Figure 2:
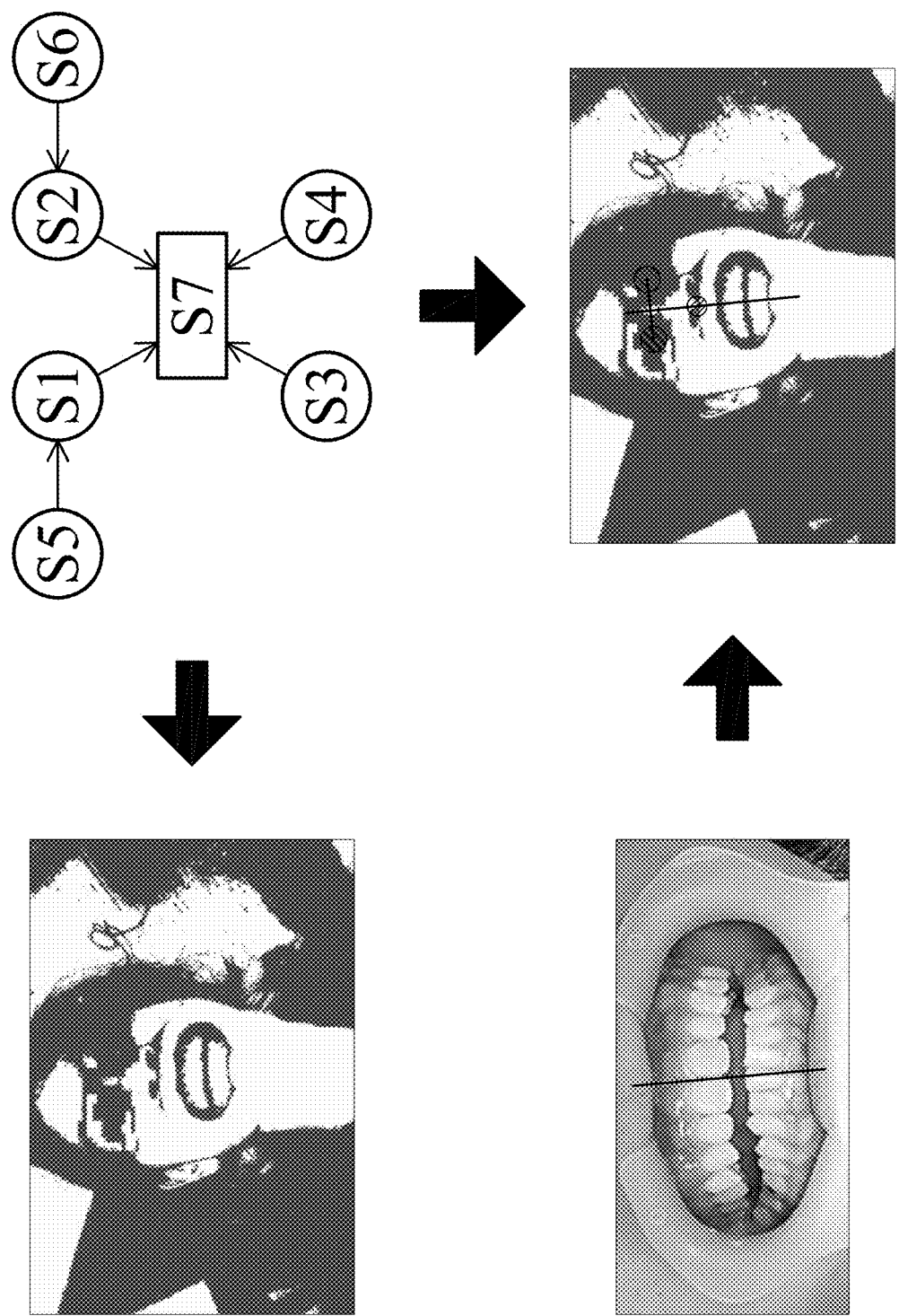
FIG. 2 illustrates obtaining a symmetry axis, in accordance with some embodiments of the present disclosure.

According to an embodiment of the present disclosure, in order to accurately position each tooth of the patient for displaying the bracket setting position in the oral image, after the image capturing unit 110 obtains the facial image of the patient, the processor 120 first obtains a plurality of facial features in the facial image to obtain a symmetry axis corresponding to the face of the patient. For example, FIG. 2 illustrates obtaining a symmetry axis, in accordance with some embodiments of the present disclosure. As shown in FIG. 2, the facial features may at least include a right eye inner corner S1, a left eye inner corner S2, a right mouth corner S3, a left mouth corner S4, a right eye outer corner S5, a left eye outer corner S6, and a nose S7. However, in the present embodiment, the processor 120 obtains the symmetry axis according to the feature of two eye inner corners and the nose of the patient, that is, the symmetry axis (as shown in the lower right corner) is obtained according to the line connecting the midpoint of the two eye inner corners (i.e., the right eye inner corner S1 and the left eye inner corner S2) to the nose (i.e., the nose S7). As shown in the lower left corner of the FIG. 2, the symmetry axis divides the patient's teeth into substantially symmetrical left and right sides.

Figure 3:
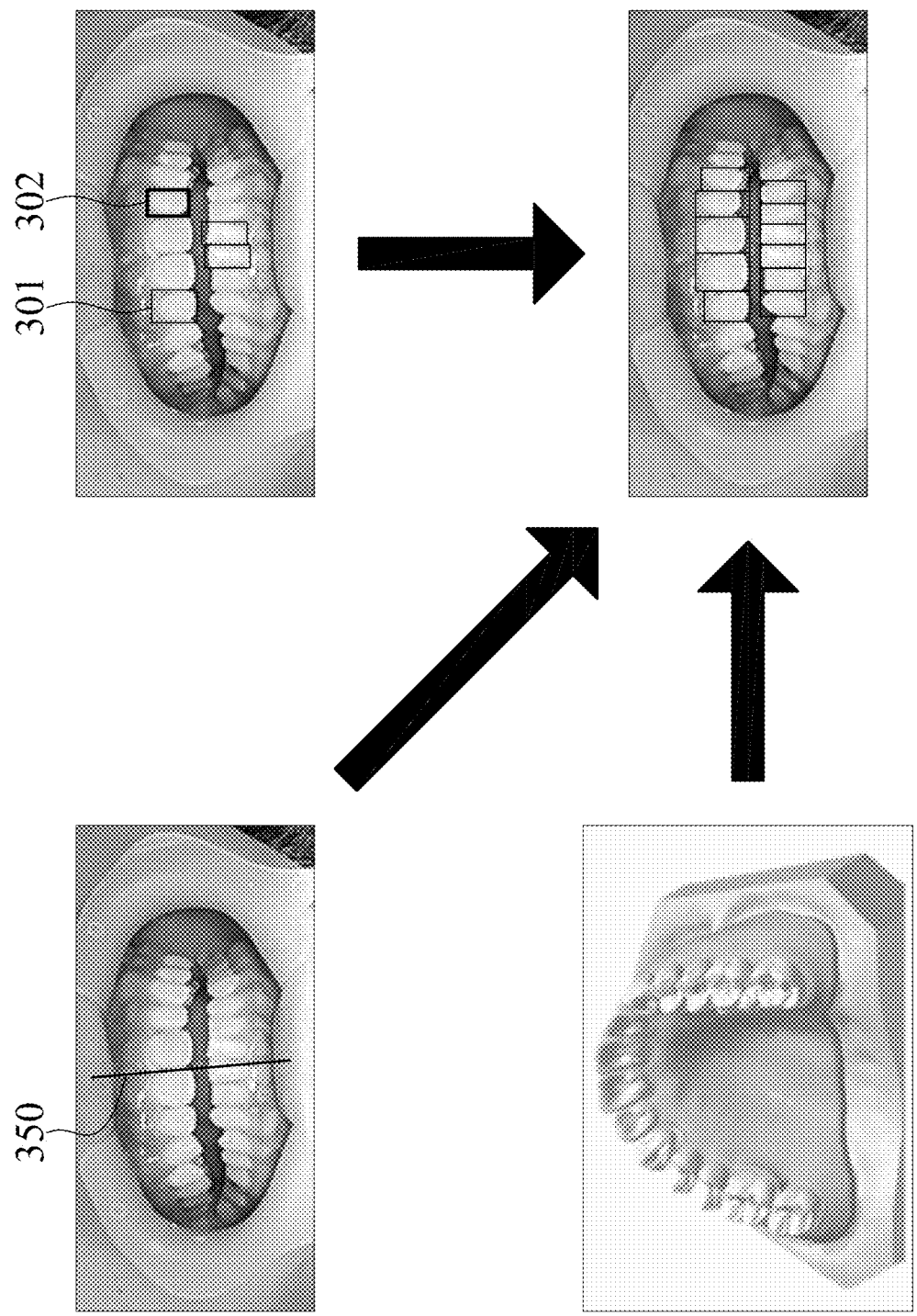
FIG. 3 illustrates obtaining the enclosing rectangle of the teeth, in accordance with some embodiments of the present disclosure.

Next, the processor 120 performs edge detection on the oral image to obtain the contour of each tooth, and further obtains an enclosing rectangle of each tooth according to the contour. Due to the effect of some external factors (e.g., the light of the surrounding environment, the shooting angle, etc.), the processor 120 may cause an error when obtaining the enclosing rectangle or cannot smoothly obtain the enclosing rectangle of each tooth. Therefore, in the present embodiment, the processor 120 further obtains the enclosing rectangle of each tooth according to the symmetry axis, the enclosing rectangle corresponding to a portion of the teeth, and the dental model information. For example, FIG. 3 illustrates obtaining the enclosing rectangle of the teeth, in accordance with some embodiments of the present disclosure. After the enclosing rectangle 301 corresponding to the right tooth of the right incisor is obtained, the processor 120 can calculate the enclosing rectangle 302 corresponding to the left tooth of the left incisor through the symmetry axis. Further, according to the relative relationship between the symmetry axis and the enclosing rectangle 302, the processor 120 may calculate that the enclosing rectangle 301 corresponds to the tooth beside the incisor, and in conjunction with the dental model information including the relative relationship between the teeth previously stored in the storage device 130, the processor 120 may obtain the position corresponding to the enclosing rectangle of each tooth (as shown in the lower right corner of FIG. 3). Alternatively, the processor 120 may also determine the position of the incisors by the area of the enclosing rectangle. In other words, the tooth with the largest area is the incisor. Through the relative position of the candidate tooth and the incisor, the position of the candidate tooth can be derived, so that the processor 120 can access the bracket setting position corresponding to the candidate tooth from the storage device 130.

Figure 4:
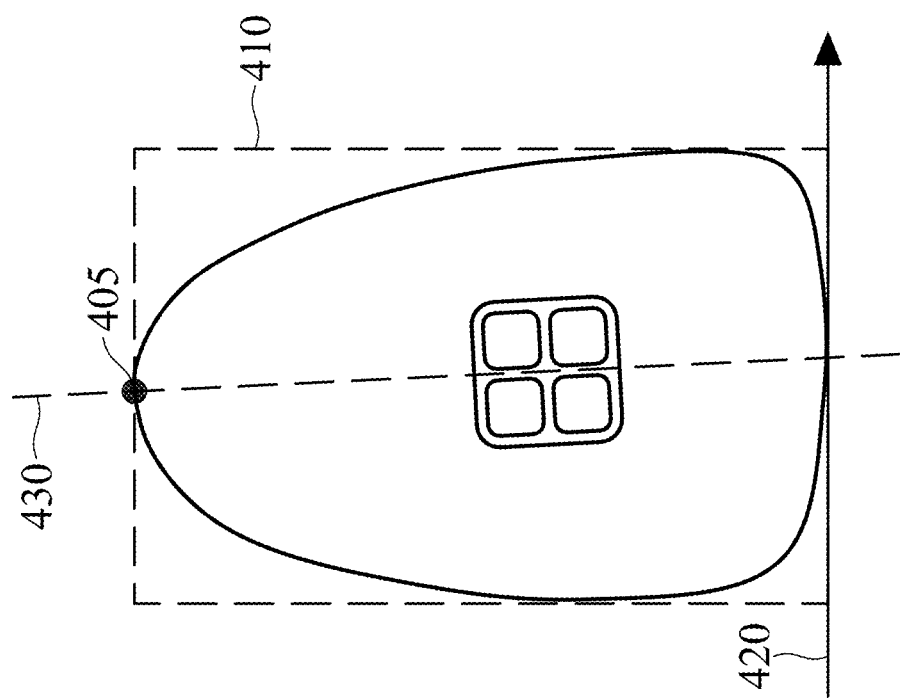
FIG. 4 illustrates an enclosing rectangle, an incisor edge, and the facial axis of the clinical crown (FACC) corresponding to a tooth, in accordance with some embodiments of the present disclosure.

The positioning of the bracket setting position is determined by the distance between the center of the bracket setting position and an incisor edge and the distance between the center of the bracket setting position and the FACC. The incisor edge is the tangent line at the bottom of the tooth. As shown in FIG. 4, the tangent line 420 below the tooth is the incisor edge. The FACC is the connecting line (as the dash line 430 shown in FIG. 4) between the vertex of the tooth (as the point 405 shown in FIG. 4) and the midpoint of the widest position of the tooth. When storing the bracket setting position, the distance between the center of the bracket setting position and the incisor edge is used as the vertical distance to be stored, and the distance between the center of the bracket setting position and the FACC is used as the horizontal distance to be stored. According to the previous steps, since the processor 120 has obtained the enclosing rectangle corresponding to the candidate tooth, the incisor edge and the FACC of the candidate tooth can be further obtained. Therefore, the bracket setting position can be displayed by overlaying the bracket setting position on the original oral image by the display unit 140.

However, in addition to overlaying the bracket setting position on the oral image, according to another embodiment, the processor 120 may also change the color of the bracket setting position in the display unit 140 or display an indication corresponding to the moving direction to indicate to the dentist how to move the bracket. For example, in the present embodiment, the bracket can present a particular color in the oral image by applying a medical dye to the bracket in advance, so that the processor 120 can track the movement of the bracket according to the color. The processor 120 can display the moving direction according to the distance error between the center of the bracket and the center of the bracket setting position or give the bracket setting position a different color according to the distance error. For example, in response to the distance error being greater than a first threshold value, the processor 120 presents the bracket setting position in red to inform the dentist that the bracket is still too far from the bracket setting position. In response to the distance error being less than the first threshold value but still greater than a second threshold value, the processor 120 presents the bracket setting position in yellow. When the distance error is less than the second threshold value, indicating that the bracket is substantially at the bracket setting position, the processor 120 presents the bracket setting position in green to inform the dentist that the bracket can be set at the current position.

As discussed above, the display unit 140 overlay the bracket setting position on the original oral image. In some embodiments, display unit 140 additionally displays a partially magnified image. This partially magnified image only shows the image of the tooth to be set the bracket and the bracket setting position of this tooth to facilitate the setting of the bracket.

Figure 5:
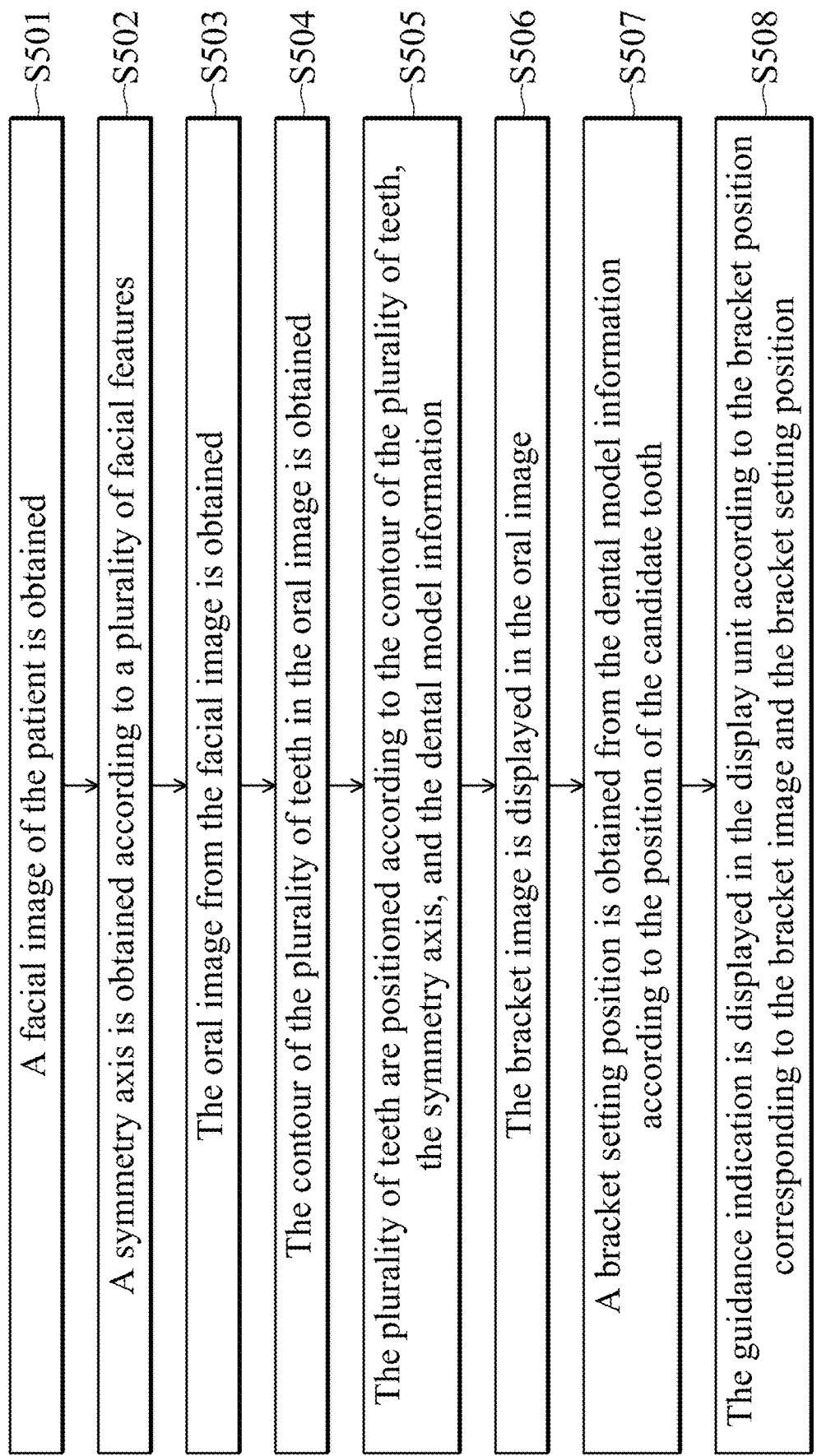
FIG. 5 is a flow chart of a positioning guidance method for brackets, in accordance with some embodiments of the present disclosure.

FIG. 5 is a flow chart of a positioning guidance method for brackets, in accordance with some embodiments of the present disclosure. In step S501, the image capturing unit 110 obtains a facial image of the patient. In step S502, the processor 120 obtains a plurality of facial features (e.g., eye corners, a nose, and mouth corners) in the facial image, and obtains a symmetry axis corresponding to the face of the patient according to the facial features. For example, in the present embodiment, the processor 120 obtains the symmetry axis corresponding to the face of the patient according to the line connecting the midpoint of the two eye inner corners to the nose. In step S503, the processor 120 obtains the oral image corresponding to the oral cavity of the patient from the facial image. In step S504, the processor 120 performs the edge detection on the oral image to obtain the contour of the plurality of teeth in the oral image. In step S505, in order to accurately display the bracket setting position corresponding to each tooth in the oral image, the processor 120 further obtains the enclosing rectangles corresponding to each tooth according to the contour, the symmetry axis, and the dental model information of the plurality of tooth. For example, due to the effect of some external factors when the processor 120 performs the edge detection on the oral image, the enclosing rectangle may have the error or cannot be obtained. The processor 120 can derive the enclosing rectangle of one tooth on one side according to the symmetry axis and the enclosing rectangle of another tooth on the other side. Further, after obtaining the relative relationship between the plurality of teeth and the symmetry axis, the processor 120 may also determine a specific position of the tooth according to the relative position, thereby the enclosing rectangle of all the teeth is indicated in the oral image according to the relative relationship of all the teeth in the dental model information stored in the storage device 130.

After obtaining the enclosing rectangle of each tooth, in step S506, the processor 120 displays the bracket image corresponding to the bracket in the oral image. Since the medical dye has been previously applied to the bracket, the bracket can present a specific color in the oral image to facilitate the processor 120 to track the bracket position according to the color. Then, in step S507, after obtaining the bracket position, the processor 120 can determine which tooth (i.e., the candidate tooth) that the bracket is located on according to the bracket position, and obtain the bracket setting position corresponding to the candidate tooth from the dental model information. Finally, in step S508, the processor 120 further calculates a distance error according to the bracket position corresponding to the bracket image and the bracket setting position to display the guidance indication in the display unit. For example, the processor 120 can display the bracket setting position in the oral image, and give the bracket setting position a different color according to the distance error. For example, in response to the distance error being greater than a first threshold value, the processor 120 presents the bracket setting position in red to inform the dentist that the bracket is still too far from the bracket setting position. In response to the distance error being less than the first threshold value but still greater than a second threshold value, the processor 120 presents the bracket setting position in yellow. When the distance error is less than the second threshold value, indicating that the bracket is substantially at the bracket setting position, the processor 120 presents the bracket setting position in green to inform the dentist that the bracket can be set at the current position. In addition, when calculating the distance error, the processor 120 uses the incisor edge as the positioning basis of the bracket setting position That is, the processor 120 calculates the horizontal error and the vertical error between the center of the bracket setting position and the center of the bracket based on the incisor edge, and displays the moving direction and/or the distance and the like in the display unit. Furthermore, in the present embodiment, the bracket setting positions are located on the FACC of each tooth. In other words, the processor 120 can obtain the FACC according to a vertex of the tooth and a middle point of the widest position of the tooth, and indicates the accurate bracket setting position based on the incisor edge of the candidate tooth in the actual oral image according to the relative relationship of the bracket setting position in the dental model information and the incisor edge.

It should be noted that although the above method has been described on the basis of a series of steps or a flowchart of a block, the present disclosure is not limited to the order of these steps, and some steps may be performed in a different order than other steps or other steps may be performed simultaneously. In addition, those skilled in the art will appreciate that the steps shown in the flowchart are not exclusive, they may include other steps of the flowchart, or one or more steps may be deleted without departing from the scope of the invention.

Furthermore, the method, particular type or portion of the present invention may exist in the form of a code. The code may be included in a physical medium such as a floppy disk, a CD, a hard disk, or any other machine readable (e.g., computer readable) storage medium, or is not limited to an external computer program product, wherein when the code is loaded and executed by a machine, such as a computer, the machine becomes a device for participating in the present disclosure. The code can also be transmitted through some transmission medium such as wire or cable, optical fiber, or any transmission type, wherein when the code is received, loaded and executed by a machine, such as a computer, the machine becomes a device for participating in the present disclosure. When the method is implemented by a general processor, this processor combining with the code provides operation for the method, like a specific device applying specific logic circuit.

According to the positioning guidance method for tooth brackets and system thereof, by positioning position of each tooth according to the contour of the tooth, loading the accurate bracket setting position according to the candidate tooth, and displaying the moving direction of the bracket or other guidance indication, the dentist can quickly set the brackets in the correct position according to the guidance indication, which will reduce the time required for surgery and improve the accuracy of the bracket setting to reduce the number of re-attaching brackets and outpatient clinic schedule.

While the disclosure has been discussed in the foregoing embodiments, it should be noted that the description is not intended to limit the disclosure. The disclosure encompasses modifications and similar arrangements that are apparent to those skilled in the art. Therefore, the scope of the claims should be interpreted in the broadest form to include all obvious modifications and similar arrangements.

What is claimed is:

1. A positioning guidance method for tooth brackets, comprising:
   obtaining, by an image capturing unit, an oral image;
   obtaining, by a processor, a position of a candidate tooth according to a contour of teeth in the oral image;
   obtaining, by the processor, a bracket setting position corresponding to the candidate tooth by accessing a dental model information from a storage device according to the position of the candidate tooth;
   obtaining, by the processor, a bracket image corresponding to a bracket from the oral image; and
   displaying, by the processor, guidance indication in a display unit according to a bracket position corresponding to the bracket image and the bracket setting position,
   wherein the method further comprises:
   obtaining, by an image capturing unit, a facial image including the oral image;

obtaining, by the processor, a symmetry axis according to a plurality of facial features of the facial image; and obtaining, by the processor, the position of the candidate tooth according to the symmetry axis, the contour of the teeth, and the dental model information.

2. The positioning guidance method as claimed in claim 1, wherein the guidance indication is displayed by the display unit as augmented reality, virtual reality or mixed reality.

3. The positioning guidance method as claimed in claim 1, wherein the bracket is coated with a dye such that the image capturing unit obtains the bracket image according to the dye.

4. The positioning guidance method as claimed in claim 1, further comprising:

obtaining, by the processor, an enclosing rectangle corresponding to each of the teeth according to the contour of the teeth.

generating, by the processor, the guidance indication according to an incisor edge of the enclosing rectangle.

5. The positioning guidance method as claimed in claim 4, wherein the bracket setting position is located on a facial axis of the clinical crown, and the facial axis of the clinical crown is obtained by the processor according to a vertex of the tooth and a middle point of the widest position of the tooth.

6. A positioning guidance system for tooth brackets, comprising:

an image capturing unit, configured to obtain an oral image of a patient;

a storage device, storing a dental model information corresponding to the patient;

a processor, configured to:

obtain a position of a candidate tooth according to the contour of the teeth in the oral image;

obtain a bracket setting position corresponding to the candidate tooth by accessing the dental model information from the storage device according to the position of the candidate tooth;

obtain a bracket image corresponding to a bracket from the oral image; and obtain guidance indication according to a bracket position corresponding to the bracket image and the bracket setting position; and a display unit, configured to display the oral image and the guidance indication, wherein the image capturing unit is further configured to obtain a facial image including the oral image, the processor is further configured to obtain a symmetry axis according to a plurality of facial features of the facial image, and the processor is further configured to obtain the position of the candidate tooth according to the symmetry axis, the contour of the teeth, and the dental model information.

7. The positioning guidance system as claimed in claim 6, wherein the guidance indication is displayed by the display unit as augmented reality, virtual reality or mixed reality.

8. The positioning guidance system as claimed in claim 6, wherein the bracket is coated with a dye such that the image capturing unit obtains the bracket image according to the dye.

9. The positioning guidance system as claimed in claim 6, wherein the processor further obtains an enclosing rectangle corresponding to each of the teeth according to the contour of the teeth and generates the guidance indication according to an incisor edge of the enclosing rectangle.

10. The positioning guidance system as claimed in claim 9, wherein the bracket setting position is located on a facial axis of the clinical crown, and the facial axis of the clinical crown is obtained by the processor according to a vertex of the tooth and a middle point of the widest position of the tooth.

* * * * *